United States Patent [19]
Cottell

[11] Patent Number: 5,009,197
[45] Date of Patent: Apr. 23, 1991

[54] METHOD OF REMOVING OIL FROM BIRDS AND ANIMALS

[76] Inventor: Eric C. Cottell, Windermere, Private Dr., Bayville, N.Y. 11709

[21] Appl. No.: 567,629

[22] Filed: Aug. 15, 1990

[51] Int. Cl.⁵ .................... A61D 11/00; A01K 29/00
[52] U.S. Cl. .................................... 119/159; 119/158
[58] Field of Search .................... 119/158, 156, 159

[56] References Cited

U.S. PATENT DOCUMENTS

| | | | |
|---|---|---|---|
| 1,311,772 | 7/1919 | Randolph | 119/158 |
| 1,604,303 | 10/1926 | Peck et al. | 119/159 |
| 1,760,017 | 5/1930 | Smoot | 119/158 |
| 2,848,977 | 8/1958 | Preshud et al. | 119/156 |
| 3,867,906 | 2/1975 | Johnson | 119/158 |
| 4,083,328 | 4/1978 | Baker | 119/158 |
| 4,836,144 | 6/1989 | Cole | 119/158 |

Primary Examiner—Paul J. Hirsch

[57] ABSTRACT

The decontamination of birds and other animals, the victims of oil spills by adding a low viscosity oil, by means of agitated tanks or sprays, to fur or feathers as a diluent followed by a water in oil emulsion, which is then inverted to an oil in water emulsion. The contaminants are thus in the internal phase and the external phase is aqueous. The remaining contaminants are then washed away with water.

3 Claims, 1 Drawing Sheet

METHOD OF REMOVING OIL FROM BIRDS AND ANIMALS

BACKGROUND OF THE INVENTION

When birds and mammals become coated with oil, such as crude oil, #6 oil, etc., their chances of survival are slim unless they can be cleaned promptly. The trauma of being handled by humans for the period of time required by present hand methods using detergents and brushes causes the expiration of many birds and animals.

DESCRIPTION OF THE PREFERRED EMBODIMENT(S)

Figure 1:
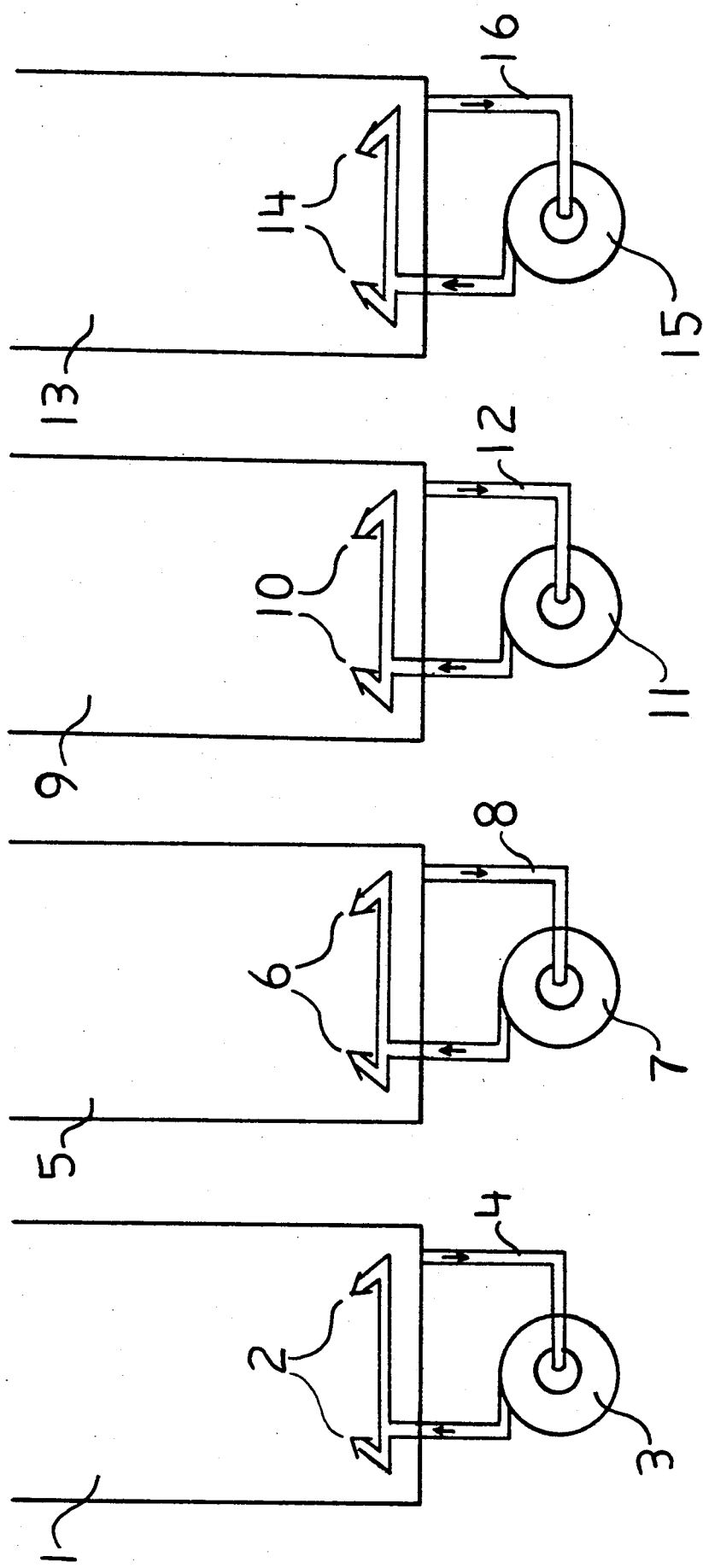
FIG. 1 is a scematic showing of the tanks and related structure as utilized to perform the method.

I have found the following method will clean the feathers or fur in a fraction of the time and much more thoroughly:

Step 1—The animal is dipped in a tank of oil such as #2 oil, mineral or vegetable oil, agitated by a pump pressuring jets which give three dimensional flow and therefore even agitation throughout the tank. Alternatively, the animal could be doused with a suitable oil.

Step 2—In a similar tank to the above, the animal is then immersed or doused with a water in oil emulsion of #2 or other oil. The animal is now coated with a water in oil emulsion which has a tendency to invert to oil in water once the internal phase (water) is built up.

Step 3—In a similar tank to the above, the animal is immersed or doused with an oil in water emulsion. This causes immediate inversion of the water in oil emulsion which is present in the fur or feathers. Now a system has been created where water is the external phase and oil the internal phase.

Step 4—In a similar tank to the above, the animal is immersed or doused with water or water containing a surfactant or detergent. This dilutes the oil in water emulsion and the animal is now decontaminated.

Because of the difficulty of handling certain animals an open mesh wire cage was devised which would restrain the animal but still allow a certain amount of movement to facilitate treatment of parts masked by wings, etc.

Immersion of the head of the animal was undesirable; therefore, a hand-held spray or jet was tapped off the high pressure side of the pump to decontaminate the head and upper part of the body.

The method is directed at reducing the treatment time and trauma associated with that to a practical minimum.

In each of the above steps the liquids are kept as close as possible to the blood temperature of the animals which can be accomplished by conventional means.

While the method describes uses four steps, it is possible that the desired result might be accomplished by leaving out one or another of the, steps. For instance, Step 1 could be bypassed as could step 3. The method described is the one found to be the most orderly.

In comparing the method with conventional detergents brushed into the animal with subsequent washing off, a single feather was contaminated with #6 oil. It was brushed with concentrated detergent for 2 minutes with a brush and then washed off with a water detergent mixture followed by plain water. After this treatment, the feather still showed discoloration and some remnants of black #6 oil and left a dark stain on a paper towel used to dry it.

A similar feather was dipped into a beaker of #2 oil and swirled about for 5 seconds, to simulate agitation; then dipped into a beaker of water in #2 oil emulsion for 2 seconds; then dipped into a beaker of #2 oil in water emulsion for 2 seconds; then dipped into a beaker of water for 2 seconds. The feather appeared clean and left only a slight discoloration on the paper towel.

FIG. 1 shows 4 similar tanks:
1 is the tank containing the diluent, say #2 oil;
2 is the jets entering the tank to give even agitation throughout;
3 is the recirculating pump;
4 is the suction pipe into the pump.
5 is the tank containing the water in oil emulsion;
6 is the jets entering the tank to give even agitation;
7 is the circulating pump;
8 is the suction pipe into the pump.
9 is the tank containing the oil in water emulsion;
10 is the jets entering the tank to give even agitation;
11 is the circulating pump;
12 is the suction pipe into the pump.
13 in the tank containing water or water with detergent;
14 is the jets entering the tank to give even agitation;
15 is the circulating pump;
16 is the suction pipe into the pump;

I claim:

1. A method of cleaning a contaminated animal by adding a diluent of similar nature to the contaminant then either directly, or by stages, inverting the diluent so that it becomes the internal phase rather than the external phase of the emulsion, which can then be diluted with more of the external phase.

2. A method according to claim 1 in which the animal is constrained in a wire mesh cage.

3. A method according to claims 1 or 2 in which a hand-held jet is pressurized from a pump to decontaminate the head and upper portion of the animal.

* * * * *